Jan. 3, 1928.
E. W. ALLEN
1,654,956
CONTROL APPARATUS
Original Filed April 30, 1925
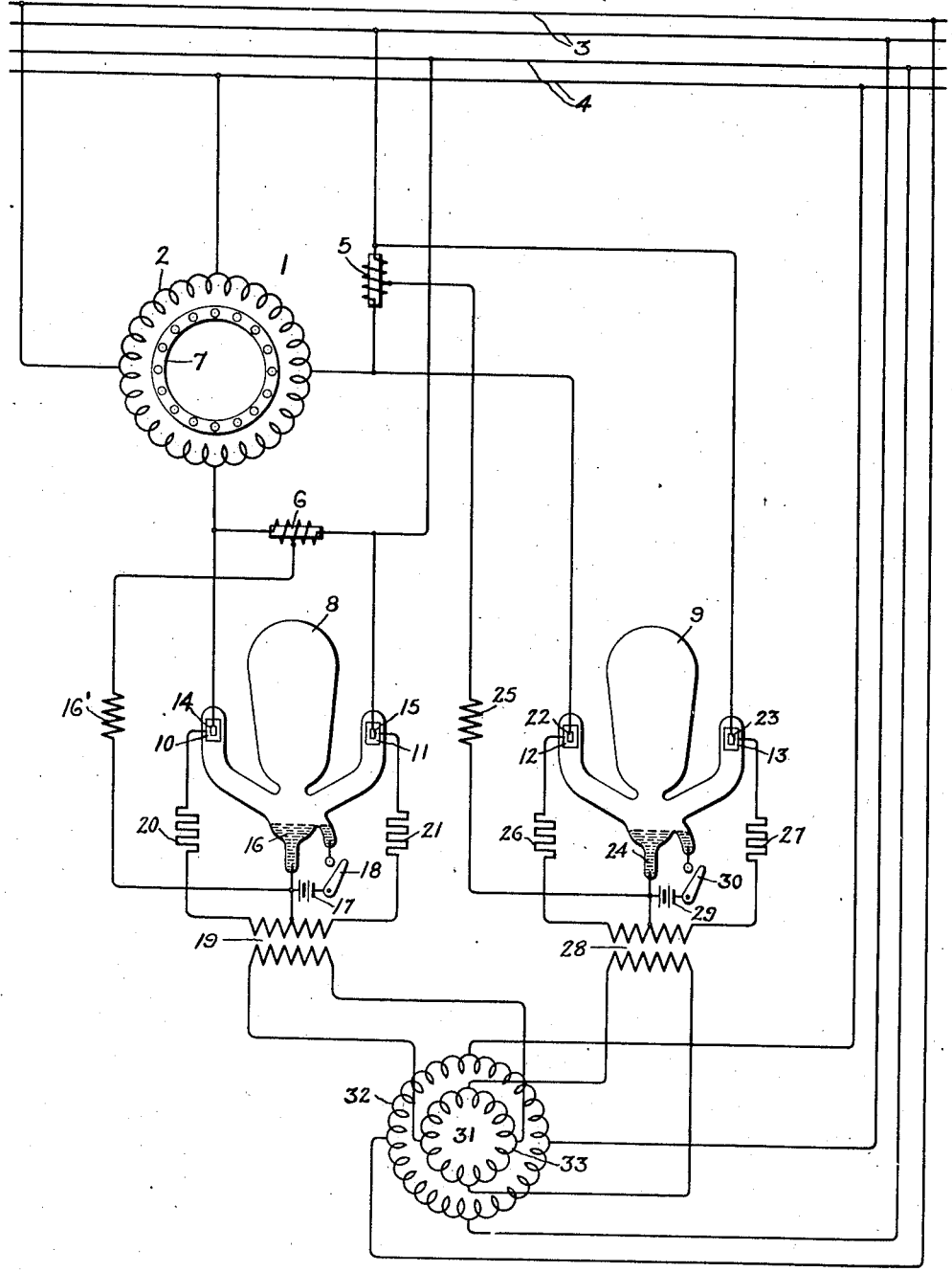
Inventor:
Edwin W. Allen;
by
His Attorney.

Patented Jan. 3, 1928.

1,654,956

UNITED STATES PATENT OFFICE.

EDWIN W. ALLEN, OF SCHENECTADY, NEW YORK, ASSIGNOR TO GENERAL ELECTRIC COMPANY, A CORPORATION OF NEW YORK.

CONTROL APPARATUS.

Application filed April 30, 1925, Serial No. 27,046. Renewed March 24, 1927.

My invention relates to control apparatus, and has for its principal object the provision of an improved reactance control apparatus that may be readily operated to vary the electrical conditions of a circuit or device.

The application of reactance devices to the control of power circuits is at present limited because of the difficulty involved in varying their reactance. As indicated by United States Letters Patent of Ernst F. W. Alexanderson, No. 1,400,847, it is possible to control a power circuit by variation in the saturation of a magnetic core inductively associated with the circuit. This method of control requires the utilization of a controllable source of direct current for varying the saturation of the core. In accordance with my invention, the controllable source of current is replaced by means comprising an electron discharge device arranged to have its grid potential controlled in a manner to shunt a variable part of the current past the reactance device.

My invention will be better understood from the following description when considered in connection with the accompanying drawing and its scope will be pointed out in the appended claims.

The drawing shows a speed control system wherein my invention has been embodied.

This system comprises an induction motor 1 which is provided with a secondary winding 7 and with a primary winding 2 connected to the phases 3 and 4 of a polyphase line through reactance control devices 5 and 6 respectively. The reactance devices 5 and 6 are provided for the purpose of controlling the speed of the motor 1 and are arranged to have their currents varied by means of electron discharge devices which are shown as mercury vapor devices 8 and 9 provided with grids 10 and 11 and grids 12 and 13 respectively.

The anodes 14 and 15 of the device 8 are connected to the opposite terminals of the reactance device 6 and the cathode 16 of the device 8 is connected to the midpoint of the device 6 through a reactor 16' which is provided for smoothing out pulsations in the load current of device 8. The usual battery 17 and switch 18 are provided for initiating operation of the device 8. The grids 10 and 11 are connected to the secondary circuit of a transformer 19 through resistors 20 and 21 which are provided for the purpose of limiting the grid current, the midpoint of the secondary circuit being connected to the cathode 16.

The device 9 is likewise arranged to have its anodes 22 and 23 connected to the opposite terminals of the device 5, to have its cathode 24 connected to the midpoint of the device 5 through a reactor 25, to have its grids 12 and 13 connected through resistors 26 and 27 to the secondary circuit of a transformer 28, to have its cathode 24 connected to the midpoint of this circuit, and to have its operation initiated by means of a battery 29 and switch 30.

Means shown as a phase shifting device 31 are provided for controlling the grid potentials of the devices 8 and 9. This phase shifting device comprises a polyphase stator winding 32 which is connected to the phases 3 and 4 of the polyphase line, and a rotor winding one phase of which is connected to the primary circuit of the transformer 19 and the other phase of which is connected to the primary circuit of the transformer 28.

With these connections, it will be readily understood that the grid voltages of the devices 8 and 9 may be shifted with respect to the anode voltages of these devices by means of the phase shifter 31; that when the grid and anode voltages of the devices 8 and 9 are opposed no current will be transmitted through these devices and the impedance drops of the reactors 5 and 6 will be comparatively high because these reactors transmit the total current of the motor 7; that the load currents of devices 8 and 9 will increase as their grid and anode voltages are brought more nearly into phase with one another and will reach their maximum value when the voltages have the same phase; and that the impedance drops of devices 5 and 6 will have their minimum value when the electron discharge device load currents are a maximum and the devices 5 and 6 transmit but a small part of the total motor current.

The devices 8 and 9 thus afford a simple and reliable means of controlling the current transmitted through the reactance devices 5 and 6. It will be apparent that the grid voltages of devices 8 and 9 may be controlled in any other suitable manner, as by means of a direct current source which is utilized in a well known manner to bias the grid voltages. The use of the phase shifter 31, however, has the advantage that the need of a separate source of control current is eliminated.

The embodiment of the invention illustrated and described herein has been selected for the purpose of clearly setting forth the principles involved. It will be apparent, however, that the invention is susceptible of being modified to meet the different conditions encountered in its use and I therefore aim to cover by the appended claims all modification within the true spirit and scope of my invention.

What I claim as new and desire to secure by Letters Patent of the United States is:

1. The combination of a device to be controlled, a reactance control device provided with a winding wound on a magnetic core and connected in series with said device, an electron discharge device provided with grids and connected to said winding for causing current to be transmitted through said winding and said load device, and means connected to said grids for controlling the potential thereof in a manner gradually to vary the magnitude of said current.

2. The combination of an induction motor, a reactance control device having a winding connected in series with said motor, an electron discharge device provided with grids and connected to said winding for causing current to be transmitted through said winding and said motor, and control means connected to said grids for varying the phase of the potential applied thereto whereby gradual changes in the current of said winding and said motor are produced.

3. The combination of a device to be operated, a reactor comprising a winding connected in series with said device for varying the electrical conditions thereof, a vapor electric device provided with grids and connected to said winding for transmitting current through said winding and said device, and phase control means connected to said grids for changing the potential thereof in a manner gradually to change said conditions.

4. The combination of a reactance control device having a magnetic core and a winding, an electron discharge device provided with grids for controlling the transmission of current between the anodes and cathodes of said device, means for connecting the anodes of said device to the opposite terminals of said winding, means for connecting the cathode of said device to said winding at a point intermediate its terminals, and means for changing the potential of said grids in a manner gradually to vary the magnetic flux of said core.

5. The combination of a reactance control device having a magnetic core and a winding, an electron discharge device provided with grids for controlling the transmission of current between the anodes and cathode of said device, means for connecting the anodes of said device to the opposite terminals of said winding, means for connecting the cathode of said device to said winding at a point intermediate its terminals, and means for changing the phase relation between the anode and grid potentials of said device.

6. The method of controlling the reactance of a device comprising a magnetic core and a winding having its terminals connected to the anodes of an electron discharge device provided with a cathode connected to said winding at a point intermediate its terminals and with grids interposed between said cathodes and anodes, which consists in varying the phase difference between the anode and grid potentials of said discharge device to vary the magnetic flux of said core.

7. The method of controlling the reactance of a device comprising a magnetic core and a winding having its terminals connected to the anodes of an electron discharge device provided with a cathode connected to said winding at a point intermediate its terminals and with grids interposed between said cathode and anodes, which consists in increasing the phase difference between the grid and anode potentials of said discharge device to increase the current of said winding, and decreasing the phase difference between said potentials to decrease the current of said winding.

8. The combination of an alternating current circuit, a device to be controlled, a reactance coil wound on a magnetic core and connected in series with said device and provided with terminals, an electric valve connected to said terminals, and means arranged to gradually vary the conductivity of said valve.

9. The combination of an alternating current circuit, a device to be controlled, a reactance coil wound on a magnetic core and connected in series with said device and provided with terminals, an electric valve connected to said terminals and provided with a grid for controlling the transmission of current between its cathode and anode, and means comprising a phase control device connected to said circuit and arranged to gradually vary the conductivity of said valve.

In witness whereof, I have hereunto set my hand this 29th day of April, 1925.

EDWIN W. ALLEN.